United States Patent
Mizutani et al.

(10) Patent No.: US 6,839,171 B2
(45) Date of Patent: Jan. 4, 2005

(54) POLYESTER FILM FOR RELEASING POLARIZER

(75) Inventors: Kei Mizutani, Sagimihara (JP); Tetsuo Ichihashi, Sagimihara (JP)

(73) Assignee: Teijin Limited, Osaka (JP)

( * ) Notice: Subject to any disclaimer, the term of this patent is extended or adjusted under 35 U.S.C. 154(b) by 52 days.

(21) Appl. No.: 10/182,203

(22) PCT Filed: Dec. 28, 2001

(86) PCT No.: PCT/JP01/11632

§ 371 (c)(1),
(2), (4) Date: Jul. 26, 2002

(87) PCT Pub. No.: WO02/056065

PCT Pub. Date: Jul. 18, 2002

(65) Prior Publication Data

US 2003/0108687 A1 Jun. 12, 2003

(30) Foreign Application Priority Data

Jan. 5, 2001 (JP) ........................ 2001-000441

(51) Int. Cl.$^7$ ................................. G02B 5/30
(52) U.S. Cl. ........................ 359/490; 359/483; 359/492; 359/500; 428/40.1; 428/41.7; 428/41.8; 428/352; 428/354; 428/480; 428/483
(58) Field of Search ................................ 359/490, 483, 359/492, 500, 63–65, 93; 428/40.1, 41.7, 41.8, 352, 354, 480, 483, 1, 358

(56) References Cited

U.S. PATENT DOCUMENTS

| | | | |
|---|---|---|---|
| 3,799,919 A | | 3/1974 | Gibbon |
| 5,677,024 A | * | 10/1997 | Abe et al. ................. 428/40.1 |

FOREIGN PATENT DOCUMENTS

| | | |
|---|---|---|
| JP | 47-34447 A | 11/1972 |
| JP | 52-40918 B | 10/1977 |
| JP | 2000-141568 A | 5/2000 |
| JP | 2000-159910 A | 6/2000 |
| JP | 2000-338327 A | 12/2000 |

OTHER PUBLICATIONS

International Publication (WO02/056065) w/International Search Report and PCT Rule 47.1(c) Notice PCT/IB/308), dated Jul. 18, 2002.

* cited by examiner

*Primary Examiner*—Audrey Chang
*Assistant Examiner*—Craig Curtis
(74) *Attorney, Agent, or Firm*—Sughrue Mion, PLLC

(57) ABSTRACT

A film for releasing a polarizing plate, which has excellent transparency, silicone adhesion and processing work efficiency, and a small orientation angle, contains little optical foreign matter and is hardly scratched.

This film comprises a coextruded polyester film comprising at least two layers and a silicone adhesive layer. The coextruded polyester film has a haze value of 4% or less and an orientation angle of 10° C. or less and contains 5 or less flyspecks having a long diameter of 90 $\mu$m or more per 0.3 $m^2$.

8 Claims, No Drawings

POLYESTER FILM FOR RELEASING POLARIZER

FIELD OF THE INVENTION

The present invention relates to a polyester film for releasing a polarizing plate. More specifically, it relates to a polyester film for releasing a polarizing plate, which has excellent transparency, slipperiness winding properties and inspection work efficiency.

PRIOR ART

In recent years, liquid crystal display devices have been widely used in the display sections of portable telephones, portable game machines, car TVs, electric appliances and personal computers rapidly. They are now in growing demand from portable telephones and notebook and space-saving desk-top personal computers in particular. Along with this, demand for liquid crystal displays and screen size are increasing. In a liquid crystal display device, polarizing films are bonded to both sides of a liquid crystal film in such a manner that polarization axes cross each other at a right angle. A release film is formed on one sides of the polarizing films before they are bonded to the liquid crystal film.

The release film is a protective film for preventing the surface of the polarizing film from being scratched, and removed from the polarizing film in the end and not used together with the product.

However, for the inspection of the polarizing films of the product before shipping, the release film must be transparent, have a small orientation angle, few flyspecks (optical foreign matter), high adhesion to silicone for obtaining releasability and high processing work efficiency. At present, a film for releasing a polarizing plate which satisfy all the above requirements is not yet to be found.

SUMMARY OF THE INVENTION

It is an object of the present invention to provide a film for releasing a polarizing plate, which has solved the above problems of the prior art, is transparent and hardly scratched, and has a small orientation angle, adhesion to silicone, few flyspecks (optical foreign matter) and high processing work efficiency.

Other objects and advantages of the present invention will become apparent from the following description.

According to the present invention, firstly, the above objects and advantages of the present invention are attained by a biaxially oriented polyester film which comprises (A) a coextruded polyester film which comprises at least two layers, has a haze value of 4% or less and an orientation angle of 10° or less, and contains 5 or less flyspecks having a long diameter of 90 $\mu$m or more per 0.3 $m^2$ of the film plane, and (B) a silicone adhesive layer formed on one side of the coextruded polyester film (A) and (C) which is used to release a polarizing plate.
The Preferred Embodiment of the Invention
<Polyester>

The polyester constituting the film of the present invention is preferably a copolymer comprising polyethylene terephthalate or ethylene terephthalate as the main recurring unit. Polyethylene terephthalate is a homopolymer having high transparency, suitable for use in a film for releasing a polarizing plate and particularly characterized by high mechanical strength.

In the present invention, the comonomer in the case of a copolyester may be a dicarboxylic acid component or a diol component. Examples of the dicarboxylic acid component as the comonomer include aromatic dicarboxylic acids such as isophthalic acid and naphthalenedicarboxylic acid, aliphatic dicarboxylic acids such as adipic acid, azelaic acid, sebacic acid and decanedicarboxylic acid, and alicyclic dicarboxylic acids such as cyclohexanedicarboxylic acid. Examples of the diol component as the comonomer include aliphatic diols such as 1,4-butanediol, 1,6-hexanediol and diethylene glycol, alicyclic diols such as 1,4-cyclohexanedimethanol and aromatic diols such as bisphenol A. They may be used alone or in combination of two or more. Out of these, isophthalic acid is particularly preferred because it provides a copolyester having high transparency and tear strength.

The amount of the comonomer which depends on its type is such that it provides a polymer having a melting point of 245 to 258° C. (melting point of a homopolymer). When the polymer has a melting point lower than 245° C., it is unsatisfactory in terms of heat resistance and film flatness due to relatively large thermal shrinkage. The melting point of the polyester is measured by a method for obtaining a melting peak using the 910 DSC of Du Pont Instruments Co., Ltd. at a temperature elevation rate of 20° C./min. The amount of a sample is about 20 mg.

The intrinsic viscosity (orthochlorophenol, 35° C.) of polyethylene terephthalate or copolyester is preferably 0.52 to 1.50, more preferably 0.57 to 1.00, particularly preferably 0.60 to 0.80. When the intrinsic viscosity is lower than 0.52, tear strength may become unsatisfactory. When the intrinsic viscosity is higher than 1.50, productivity in the step of producing raw materials and the step of forming a film may be impaired.

Polyethylene terephthalate or copolyester in the present invention is not limited by its production process. For example, an esterification reaction is carried out by adding terephthalic acid and ethylene glycol and further a comonomer in the case of a copolyester and then the polycondensation reaction of the obtained reaction product is carried out until the targeted degree of polymerization is achieved to obtain polyethylene terephthalate or copolyethylene terephthalate. Alternatively, an ester exchange reaction is carried out by adding dimethyl terephthalate and ethylene glycol and further a comonomer in the case of a copolyester, and the polycondensation reaction of the obtained reaction product is carried out until the targeted degree of polymerization is achieved to obtain polyethylene terephthalate or copolyethylene terephthalate. Polyethylene terephthalate or copolyethylene terephthalate obtained by the above method (melt polymerization) can be further polymerized in a solid-phase (solid-phase polymerization) as required to obtain a polymer having a higher degree of polymerization.

To the above polyester may be added additives such as an antioxidant, thermal stabilizer, viscosity modifier, plasticizer, color improving agent, lubricant and nucleating agent as required. The catalyst used for the above polycondensation reaction is preferably a titanium compound (Ti compound) or germanium compound (Ge compound).

The coextruded polyester film (A) constituting the film of the present invention is characterized in that it comprises at least two layers, has a haze value of 4% or less and an orientation angle of 10° C. or less, and contains 5 or less flyspecks having a long diameter of 90 $\mu$m or more per 0.3 $m^2$ of the film plane.
<Fine Particles to be Added>

It is preferred to add lubricant fine particles to the film of the present invention in order to ensure the high work efficiency (slipperiness) of the film. It is also preferred to adjust the average particle diameter and the amount of lubricant fine particles to be added to each layer to the optimum ranges in order to maintain transparency as well. Any lubricant fine particles may be used. Inorganic lubricants include silica, alumina, titanium dioxide, calcium carbonate and barium sulfate, and organic lubricants include spherical silicone resin particles and crosslinked polystyrene particles.

As for the average particle diameter of lubricant particles to be added to each layer, the average particle diameter of relatively large particles to be added to a layer on the polarizing film side is preferably 1 to 3 μm, more preferably 1 to 2.5 μm, more preferably 1 to 2 μm. The average particle diameter of relatively small lubricant particles is preferably 0.05 to 0.8 μm, more preferably 0.1 to 0.7 μm. When the average particle diameter of the large particles is larger than 3 μm, peel strength between a silicone layer formed on the above layer and the polarizing film becomes too low, whereby the polarizing film may peel off of itself and the practical applicability of the film may lower. When the obtained film is rolled, projections may be transferred, causing surface defects. When the average particle diameter is smaller than 1 μm, peel strength between the silicone layer formed on the above layer and the polarizing film becomes too high, whereby removing work efficiency may lower and a defect such as a peeling mark may be found on the surface of the polarizing film. When the average particle diameter of the small particles is larger than 0.8 μm, scratch resistance is hardly obtained. When the average particle diameter of the small particles is smaller than 0.05 μm, the amount of the lubricant particles must be increased to obtain scratch resistance and a film having a haze value of more than 4% is obtained. The amount of the lubricant particles to be added to the exterior layer differs according to whether the film comprises two layers or three layers (or more layers). In the case of 3 (or more) layers, the amount is substantially the same as that of the layer on the polarizing film side. Since a silicon layer is not applied to this layer, the lower limit of average particle diameter of the large particles is preferably 0.5 μm. In this case, as the lubricant particles of the intermediate layer other than the outermost layer do not contribute to work efficiency and reduce transparency, they are preferably as small in quantity as possible. In consideration of recycling of a collected product, the amount of the lubricant particles is preferably not 0%. The content of the lubricant particles in the intermediate layer is preferably 70% or less, more preferably 50% or less of the content of the lubricant particles in the layer on the polarizing film side. When the content is higher than 70%, transparency may lower and a defect is veiled at the time of the defect inspection of the polarizing plate. In the case of two layers, to provide high work efficiency to the outer layer as well, the content of the lubricant particles in the outer layer is preferably 70% or less, more preferably 20% or more of the content of the lubricant particles in the layer on the polarizing film side. When the content is lower than 20%, slipperiness and work efficiency may deteriorate.

In order to reduce the number of coarse particles and the number of flyspecks, it is recommended to filter a molten polymer with a nonwoven cloth type filter having an average opening of 10 to 30 μm, preferably 15 to 25 μm and made of stainless steel thin wires having a line diameter of 15 μm or less as a filter at the time of forming a film. By this method, almost all of coarse particles having a particle diameter of 20 μm or more and flyspecks having a long diameter of 90 μm or more can be removed.

The material of the lubricant particles is not limited but a globular silicone resin and globular silica are preferred as particles having an average particle diameter of 0.2 to 3 μm and particles having a sharp particle size distribution and a Moh's hardness of 5 or more are also preferred because they are little deformed. Alumina, silica, titanium oxide, zirconia and composite oxides thereof are preferred as particles having an average particle diameter of 0.05 to 0.8 μm. They may be used in combination of two or more.

The lubricant particles may be added to a reaction system (preferably as a slurry in glycol) during a reaction for the production of a polyester, for example, at any time during an ester exchange reaction or polycondensation reaction in the case of an ester exchange method, or at any time in the case of a direct polymerization method. Particularly preferably, the particles are added to the reaction system in the initial stage of the polycondensation reaction, for example, before the intrinsic viscosity becomes about 0.3.

At least the layer underlying the adhesive layer (B) of the coextruded polyester film (A) contains inert particles having an average particle diameter of 1 to 3 μm in an amount of preferably 50 to 300 ppm, more preferably 60 to 200 ppm, much more preferably 70 to 150 ppm and inert particles having an average particle diameter of 0.05 to 0.8 μm in an amount of preferably 100 to 4,000 ppm, more preferably 150 to 3,000 ppm, much more preferably 200 to 2,500 ppm.

<Film Thickness>

The thickness of the film of the present invention is preferably 15 to 75 μm. It is more preferably 20 to 70 μm, particularly preferably 25 to 65 μm. When the thickness is larger than 75 μm, the haze value may become larger than 4%, the inspection accuracy decreases and the cost increases disadvantageously. When the thickness is smaller than 15 μm, the film becomes unsatisfactory in terms of stiffness, thereby making it difficult to remove the film at the time of release.

As for the thickness of each layer, the thickness of a layer on the polarizing film side, that is, a layer underlying the adhesive layer (B) is preferably 3 to 50%, more preferably 4 to 40%, much more preferably 5 to 30% of the total thickness. In the case of two layers, the thickness of the other layer is preferably 50 to 97%, more preferably 60 to 96%, much more preferably 70 to 95% of the total thickness. When the thickness of the layer on the polarizing film side, that is, the coarse layer is larger than 50%, the haze value may become larger than 4% and when the thickness is smaller than 3%, the film winding properties may deteriorate and the product yield may drop. In the case of three (or more) layers, the thickness of the surface layer on a side opposite to the polarizing film side is preferably 3 to 20% of the total thickness. When the thickness is smaller than 3%, the effect is small and when the thickness is larger than 20%, the haze value may become large.

<Flyspecks>

The number of flyspecks having a long diameter of 90 μm or more contained in the coextruded polyester film of the present invention must be 5 or less per 0.3 $m^2$. The number of the flyspecks having a long diameter of 90 μm or more is desirably as small as possible because they prevent light from going straight and cause a distorted image. Since the flyspecks are formed from foreign matter, undissolved polymer or coarse particle as a nucleus, it is preferred to remove coarse particles and foreign matter by using the above-described nonwoven cloth type filter. It is more preferred to use lubricant particles which do not contain substances forming the flyspecks in large quantities.

More preferably, the coextruded polyester film (A) contains only 30 or less flyspecks having a long diameter of 20 to 50 μm per 0.3 $m^2$ of the film plane.

<Orientation Angle>

The orientation angle of the coextruded polyester film (A) of the present invention is 10° or less. When the orientation angle is larger than 10°, the field of view becomes dark at the time of inspecting the polarizing film, thereby reducing the detection accuracy of foreign matter. In order to obtain a film having an orientation angle of 10° or less, it is preferred to use only 20% of the center portion in a width direction of a film forming machine. The term "orientation angle" as used herein means an angle from the width (transverse) direction of the orientation main axis made by stretching. A general polyester film which has been stretched in longitudinal and transverse directions sequentially is slightly oriented in a transverse direction or uniformly oriented at the center in the width direction at the time of film formation and this orientation angle is considered as 0°. The birefringence factor of the coextruded polyester film (A) is preferably 0.12 or less.

When the film can be supplied in the form of a leaf-like film, it is punched by inclining one side of a puncher at an angle corresponding to the orientation angle from the transverse direction so that an end part can be used but a loss increases toward the end.

When an apparatus which holds both ends in a width direction of the film by means of a gripper and can heat the film such that the width of the film at the inlet becomes almost equal to the width of the film at the outlet is used, in the heating step to be described in the section "film forming method", a film is formed by setting the treatment temperature to a low level and reducing the movement of a center portion to ½ of the usual movement. This movement is obtained from the amount of curvature of a straight line which has been drawn on the film going into a transverse-direction stretching machine in the transverse (width) direction with an inking string or the like after the film comes out from the transverse-direction stretching machine. This film is let pass through the heat treating apparatus which has a gripper and can make the width of the film at the inlet almost equal to the width of the film at the outlet to be heated at 200 to 245° C. At this point, it is important that at the time of the heat treatment, the film should travel in an opposite direction to the direction when it is formed, and the conditions are set so as to change the above curved line to almost its original straight line. By this treatment, the anisotropy of the both portions is canceled and an orientation angle of 10° or less can be achieved along the entire width. However, a reduction in yield caused by a decline in productivity (an increase in the number of steps) and the scrapping of a gripper portion cannot be avoided disadvantageously. As long as the above apparatus can be used, this method can be employed.

<Surface Roughness>

The center line surface roughness Ra of the coextruded polyester film (A) of the present invention is preferably 20 to 60 nm. When Ra is smaller than 20 nm, the film surfaces are apt to stick to each other, whereby the appearance of a roll and work efficiency worsen and the surface is readily scratched. When Ra is larger than 60 nm, transparency and inspection work efficiency may deteriorate. The 10-point average surface roughness Rz of the film is preferably 500 nm or more on the silicone coated side. When Rz is smaller than 500 nm, the number of projections formed on the surface of the silicone coated layer becomes extremely small, thereby making it difficult to remove the film from the polarizing film. Although the upper limit of Rz cannot be specified, Ra must not be larger than 60 nm. To obtain the above surface roughness, the above lubricant particles must be added.

<Silicone Adhesive Layer>

The film of the present invention has a silicone adhesive layer on the surface on the polarizing film side. Silicone is required to remove the film of the present invention which is used to protect the surface of the polarizing film from the polarizing film. Since adhesion between the polyester film and silicone is low, a treatment for providing adhesion is required to form a silicone layer. A silicone adhesive layer for this purpose, that is, a primer layer is formed on the coextruded polyester film.

The primer layer preferably contains a silane coupling agent, for example, a product of hydrolysis of a compound represented by the formula $Y—R—Si(X)_3$ wherein Y is a vinyl group, epoxy group, amino group or mercapto group, R is a direct bond or alkylene group having 1 to 6 carbon atoms which may be interrupted by an amino group, and X is an alkoxy group having 1 to 6 carbon atoms.

Specific examples of the silane coupling agent include vinyltriethoxysilane, vinyltrimethoxysilane, γ-glycidoxypropyl trimethoxysilane, γ-glycidoxypropylmethyl diethoxysilane, N-β(aminoethyl)-γ-aminopropyl trimethoxysilane, N-β(aminoethyl)-γ-aminopropylmethyl dimethoxysilane and γ-mercaptopropyl trimethoxysilane. The silane coupling agent is preferably a coupling agent having water solubility or water dispersibility, such as N-β-(aminoethyl)-γ-aminopropyl trimethoxysilane and N-β-(aminoethyl)-γ-aminopropylmethyl dimethoxysilane.

The primer layer may further contain alkaline inorganic particles.

Examples of the alkaline inorganic particles include an iron oxide sol, alumina sol, tin oxide sol, zirconium oxide sol and silica sol. An alumina sol and silica sol are preferred. Out of these, a silica sol is particularly preferred because it promotes the initial reactivity (dimerization and trimerization) of the silane coupling agent.

The alkaline inorganic particles preferably have a large surface area and a small particle diameter. The average particle diameter of the alkaline inorganic particles is preferably 1 to 150 nm, more preferably 2 to 100 nm, particularly preferably 3 to 50 nm. When the average particle diameter is larger than 150 nm, the surface area becomes too small, the function of promoting the reactivity of the silane coupling agent lowers, and the surface of the primer layer becomes rough disadvantageously. When the average particle diameter is smaller than 1 nm, the surface area becomes too large and the control of the reactivity of the silane coupling agent becomes difficult disadvantageously.

The amount of the alkaline inorganic particles is preferably 1 to 50 wt %, more preferably 2 to 20 wt % based on the silane coupling agent. When this amount is smaller than 1 wt %, a crosslinking reaction does not proceed and when the amount is larger than 50 wt %, a coating solution lacks stability, for example, a precipitate is formed in the coating solution in a short period of time after the addition of the inorganic particles.

A primer coating solution containing a silane coupling agent and alkaline inorganic particles, particularly an aqueous primer coating solution has a pH of 4.0 to 7.0, preferably 5.0 to 6.7. When pH is lower than 4.0, the catalytic activity of the inorganic particles is lost and when pH is higher than 7.0, the coating solution becomes unstable and a precipitate is formed disadvantageously. The acid for adjusting this pH is an inorganic acid such as hydrochloric acid, nitric acid or sulfuric acid, or an organic acid such as oxalic acid, formic acid, citric acid or acetic acid. An organic acid is particularly preferred.

A surfactant such as an anionic, cationic or nonionic surfactant may be added in a required amount to the above coating solution, particularly aqueous coating solution. Preferably, the surfactant can reduce the surface tension of the coating solution to 0.5 N/m or less, preferably 0.4 N/m or less and promotes wetting to the polyester film. Examples of the surfactant include polyoxyethylene alkylphenyl ethers, polyoxyethylene-fatty acid ester, sorbitan fatty acid esters, glycerin fatty acid esters, fatty acid metal soap, alkyl sulfates, alkyl sulfonates, alkyl sulfosuccinates, quaternary ammonium chloride salts and alkylamine salts. Other additives such as an antistatic agent, ultraviolet light absorber, pigment, organic filler, lubricant and anti-blocking agent may be mixed in limits that do not cancel the effect of the present invention.

The primer coating solution is applied to one side of the polyester film, dried and thermally crosslinked to form a crosslinked primer layer. Coating may be carried out in the general primary coating step, that is, the step of coating a polyester film which has been biaxially oriented and heat set, separately from the step of producing the film. However, in this step, coating is desirably carried out in a clean atmosphere to prevent dust from being contained in the film. From this point of view, coating is preferably carried out in the step of producing a polyester film. Particularly preferably, an aqueous coating solution of the primer is applied to one side or both sides of the polyester film before the end of crystal orientation in the above step.

The polyester film before the end of crystal orientation includes an unstretched film obtained by thermally melting the polyester into a film form directly, uniaxially oriented film obtained by stretching an unstretched film in a longitudinal (length) direction or transverse (width) direction and a biaxially oriented film obtained by stretching an unstretched film in longitudinal and transverse directions at a low draw ratio (biaxially oriented film before the end of crystal orientation by re-stretching in a longitudinal or transverse direction in the end). In the regular step, the coating solution is preferably applied after the film is stretched in a longitudinal direction.

The solids content of the above coating solution is generally 30 wt % or less, preferably 10 wt % or less. The amount of coating is preferably 0.5 to 20 g, more preferably 1 to 10 g per 1 m$^2$ of the traveling film.

Conventionally known coating methods may be employed, such as kiss coating, bar coating, die coating, reverse coating, off-set gravure coating, Meyer bar coating, gravure coating, roll brushing, spray coating, air knife coating, impregnation and curtain coating which may be used alone or in combination.

The polyester film coated with the coating solution before the end of crystal orientation is dried and introduced to the steps of stretching and heat setting. For example, the polyester film which has been stretched in a longitudinal direction and coated with an aqueous solution is supplied to a stenter to be stretched in a transverse direction and heat set. During this, the coating solution is dried and thermally crosslinked. This treatment can be carried out under conditions accumulated in the persons skilled in the art. As for preferred conditions, the drying temperature is 90 to 130° C., the drying time is 2 to 10 sec, the stretching temperature is 90 to 130° C., the draw ratio is 3 to 5 times in a longitudinal direction and 3 to 5 times in a transverse direction and 1 to 3 times when the film is re-stretched in the longitudinal direction, the heat setting temperature is 180 to 240° C., and the heat setting time is 2 to 20 sec. The thickness of the coating film after the above treatment is 0.02 to 1 μm, preferably 0.04 to 0.5 μm.

The 10-point average surface roughness Rz of this coating film is preferably 500 nm or more.

<Film Forming Method>

The polyester film for releasing a polarizing plate of the present invention can be basically produced by a conventionally known method or a method accumulated in the persons skilled in the art. For example, it can be obtained by first producing an unstretched laminated film and then biaxially stretching the film. This unstretched laminated film can be produced by a coextrusion method which is a conventionally accumulated method of producing a laminated film.

In consideration of the thickness ratio of the layers, the laminated film produced by the above method is further stretched in longitudinal and transverse directions by a conventionally accumulated method of producing a biaxially oriented film to obtain a biaxially oriented film. For example, polyesters are molten and coextruded at a temperature of melting point (Tm: ° C.) to (Tm+70)° C. to obtain an unstretched laminated film which is then stretched to 2.5 times or more, preferably 3 times or more in a uniaxial direction (longitudinal direction or transverse direction) at a temperature of (Tg−10) to (Tg+70)° C. (Tg: glass transition temperature of polyester) and then to 2.5 times or more, preferably 3 times or more in a direction perpendicular to the above stretching direction at a temperature of Tg to (Tg+70)° C. The film may be optionally re-stretched in a longitudinal direction and/or transverse direction. The total draw ratio is preferably 9 times or more, more preferably 12 to 35 times, particularly preferably 15 to 30 times in terms of area draw ratio.

The biaxially oriented film may be further heat set at a temperature of (Tg+70)° C. to (Tm−10)° C. For example, in the case of polyethylene terephthalate, heat setting is preferably carried out at 180 to 235° C. In the step of joining the film to the polarizing film, the heat setting temperature is set to 225 to 235° C. when there is a problem with heat shrinkage and to 180 to 210° C. when there is no problem to achieve a wide orientation angle of 10° or less. The heat setting time is preferably 1 to 60 sec.

During the above step, a water-dispersible coating solution is preferably applied to one side (in contact with the polarizing film) of the film after stretching in a longitudinal direction to form a silicone layer having a thickness of 5 to 200 nm on after the silicone adhesive layer is dried. The coating method is not limited but it is preferably coating with a reverse roll coater. The other conditions are the same as described above.

This silicone layer is preferably composed of a cured silicone resin coating film formed by curing a curable silicone resin coating.

This cured silicone resin coating film can be formed by applying a coating solution containing a curable silicone resin to at least one side of the film, drying and curing it.

Examples of the curable silicone resin include silicone resins cured by any reaction system such as a condensation reaction, addition reaction and exposure to ultraviolet radiation or electron beam. They may be used alone or in combination.

The curing reactions of silicone may be represented by the following formulas.

Condensation Reaction

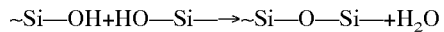
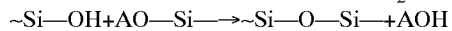

(A is a lower alkyl group)

Addition Reaction

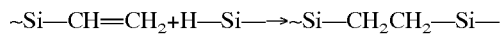

Curing Reaction by Ultraviolet Radiation or Electron Beam

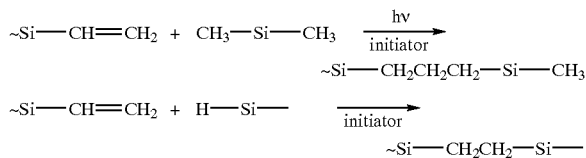

An example of the silicone resin obtained by the above condensation reaction system is a silicone resin obtained by carrying out a condensation reaction between polydimethylsiloxane having a terminal OH group and polydimethylsiloxane (hydrogensilane) having a terminal H group in the presence of an organic tin catalyst (such as an organic tin acylate catalyst) to form a 3-D crosslinked structure.

An example of the silicone resin obtained by the addition reaction system is a silicone resin obtained by reacting polydimethylsiloxane having a vinyl group at a terminal with hydrogensilane in the presence of a platinum catalyst to form a 3-D crosslinked structure.

The silicone resin obtained by curing by ultraviolet radiation is obtained by making use of the same radical reaction as the general crosslinking of silicone rubber as the most basic type, by introducing an acryl group and optically curing, by decomposing an onium salt by ultraviolet radiation to generate a strong acid and cleaving an epoxy group with the strong acid for crosslinking, or by crosslinking through an addition reaction between thiol and vinylsiloxane. Electron beams have stronger energy than ultraviolet radiation and causes a radical crosslinking reaction without using an initiator unlike curing by ultraviolet radiation.

The curable silicone resin has a polymerization degree of 50 to 200,000, preferably 1,000 to 100,000. Examples of the curable silicone resin include KS-718,-774, -775, -778, -779H, -830, -835, -837, -838, -839, -841, -843, -847 and -847H, X-62-2418, -2422, -2125, -2492, -2494, -470, -2366 and -630, X-92-140 and -128, and KS-723A·B, -705F, -708A, -883, -709 and -719 of Shin-Etsu Silicone Co., Ltd.; TPR-6701, -6702, -6703, -6704, -6705, -6722, -6721 and -6700, XSR-7029, YSR-3022 and YR-3286 of Toshiba Silicone Co., Ltd.; DK-Q3-202, -203, -204, -210, -240, -3003, -205 and -3057 and SFXF-2560 of Dow Corning Co., Ltd.; SD-7226, 7320 and 7229, BY24-900, 171, 312 and 374, SRX-375, SYL-0FF23, SRX-244 and SEX-290 of Toray Silicone Co., Ltd.; and SILCOLEASE 425 of ICI Japan Co., Ltd. Silicone resins disclosed in JP-A 47-34447 and JP-B 52-40918 may also be used (the term "JP-A" as used herein means an "unexamined published Japanese patent application") (the term "JP-B" as used herein means an "examined Japanese patent publication").

To form the above cured silicone resin coating film on the surface of the film, conventionally known coating methods such as bar coating, doctor blade coating, reverse roll coating and gravure roll coating may be used.

The drying and curing (thermal curing and ultraviolet radiation curing) of the coating film may be carried out separately or simultaneously. When they are carried out simultaneously, the film is preferably heated at 100° C. or more. As for drying and thermal curing conditions, the film is preferably heated at 100° C. or more for 30 sec or so. When the drying temperature is 100° C. or less and the curing time is 30 sec or less, the coating film is not cured completely, whereby durability is not secured with the result that the coating film may come off.

The thickness of the cured silicone resin coating film is not particularly limited but it is preferably 0.05 to 0.5 $\mu$m. When the thickness is too small, release performance deteriorates and satisfactory performance cannot be obtained. When the thickness is too large, curing takes time, thereby bringing an undesired result in production.

For utilizing the release film of the present invention, it is formed on the adhesive layer of a polarizing plate, a phase difference polarizing plate or a phase difference plate having an adhesive layer on one side in such a manner that the adhesive layer and the cured silicone resin coating film of the release film come into contact with each other.

EXAMPLES

The following examples are given to further illustrate the present invention.

Physical property values and characteristic properties in the present invention were measured and evaluated in accordance with the following methods.

(1) Haze Value

The haze value of the film is measured in accordance with JISP-8116 using the haze meter (NDH-20) of Nippon Denshoku Kogyo Co., Ltd. The evaluation criteria are as follows.

○: haze value of 4% or less

X: haze value of more than 4%

(2) Orientation Angle

Using a polarization microscope, the field of view is made dark without a sample. The sample is inserted by aligning the polarization axis direction of an analyzer with the horizontal direction of the sample. The field of view remains dark when the orientation angle is 0° and becomes bright in other cases. By rotating the sample, the field of view is made dark. The rotation angle is the orientation angle of the sample. The evaluation criteria are as follows.

○: orientation angle of 10° or less

X: orientation angle of more than 10°

(3) Birefringence Factor

This is a difference between the refractive index (nx) in the width direction of the film and the refractive index (ny) in a direction perpendicular to the above direction of the film at visible light ($\lambda$=589 nm) and an absolute value obtained from the following expression.

$$\Delta n \text{ (birefringence factor)}=|(nx)-(ny)|$$

(4) Flyspecks

A sample is placed on the polarizing plate of an apparatus having a surface light source, cross polarizing plate and magnifying glass and observed. When the field of view is made dark by rotating the sample, flyspecks are seen bright. The number of flyspecks having a long diameter of 90 $\mu$m or more per 0.3 m$^2$ of the area of the sample is counted. The evaluation criteria are as follows.

○: 5 or less flyspecks having a long diameter of 90 $\mu$m or more per 0.3 m$^2$ X: 6 or more flyspecks having a long diameter of 90 $\mu$m or more per 0.3 m$^2$ (5) Surface Roughness a. Center Line Surface Roughness (Ra)

The front and rear surfaces of the film are measured by a surface roughness meter (Surfcom 111A of Tokyo Seimitsu Co., Ltd.) and the average of the measurement values is calculated as the surface roughness of each surface.

b. 10-point Average Surface Roughness (Rz)

The surface roughnesses at five highest points (Hp1, Hp2, Hp3, Hp4, Hp5) and five lowest points (Hv1, Hv2, Hv3, Hv4, Hv5) are measured and the average roughness of these is taken as Rz. That is, the 10-point average surface roughness can be obtained from Rz=[(Hp1+Hp2+Hp3+Hp4+Hp5)−(Hv1+Hv2+Hv3+Hv4+Hv5)]/5.

(6) Average Particle Diameter of Particles
a. In the Case of Primary Particles

This is measured using the CP-50 centrifugal particle analyzer of Shimadzu Corporation. A particle diameter equivalent to 50 mass percent is read from a cumulative curve of the particles of each diameter and the amount thereof calculated based on the obtained centrifugal sedimentation curve and taken as the above average particle diameter (refer to "Particle Size Measurement Technology" issued by Nikkan Kogyo Press, pp. 242–247, 1975).

b. In the Case of Agglomerated Particles

When the inert fine particles added as a lubricant are secondary particles formed by the agglomeration of primary particles, the following method is used because the average particle diameter measured by the above method may be smaller than the actual average particle diameter. A super thin piece having a thickness of 100 nm in a sectional direction is cut out from the film containing the particles to observe agglomerates of particles (secondary particles) through a transmission electron microscope (for example, JEM-1200EX of JEOL Ltd.) at a magnification of ×10,000. Using this photomicrograph, the circle area-equivalent diameter of each of 1,000 particles is measured using an image analyzer or the like to obtain a number average particle diameter as average secondary particle diameter. The identification of the type of particle can be carried out by the quantitative analysis of a metal element by SEM-XMA or ICP. The average primary particle diameter is measured in accordance with the method of measuring average secondary particle diameter except that the magnification of a transmission electron microscope is ×100,000 to ×1,000,000.

(7) Film Thickness

The thickness of the film is measured at 100 points with an external micrometer and the average of the measurement values is obtained as the thickness of the film.

(8) Melting Point

The melting peak is obtained by the 910 DSC of Du Pont Instruments Co., Ltd. at a temperature elevation rate of 20° C./min. The amount of a sample is about 20 mg.

Example 1

Polyethylene terephthalate having an intrinsic viscosity (orthochlorophenol, 35° C.) of 0.65 was polymerized with dimethyl terephthalate and ethylene glycol in the presence of manganese acetate as an ester exchange catalyst and a polymerization reaction in accordance with a commonly used method by adding germanium oxide as a polymerization catalyst, phosphorous acid as a stabilizer, 0.005 wt % based on the polymer of globular silicone particles having an average particle diameter of 1,200 nm, 0.2 wt % based on the polymer of globular calcium carbonate having an average particle diameter of 600 nm and 0.1 wt % based on the polymer of alumina having an average particle diameter of 400 nm as lubricants. The pellet of this polyethylene terephthalate were dried at 170° C. for 3 hours, supplied into an extruder, molten at a melting temperature of 295° C., filtered with a nonwoven cloth type filter having an average opening of 24 μm and made of stainless steel thin wires having a line diameter of 13 μm, and extruded from both surface layers of a T-shaped three-layer die. A polymer prepared by diluting lubricant particles with a polymer containing no lubricant to adjust the amount thereof as shown in Table 1 was supplied into another extruder and extruded from the intermediate layer of the above T-shaped three-layer die under the same conditions as described above. This three-layer molten product was extruded onto a rotary cooling drum having a surface finish of 0.3 s and a surface temperature of 20° C. to obtain an unstretched film consisting of 70 μm, 394 μm and 70 μm thick layers and having a total thickness of 534 μm.

The thus obtained unstretched film was pre-heated at 75° C. and stretched to 3.6 times between a low-speed roller and a high-speed roller by heating with one infrared heater having a surface temperature of 800° C. 15 mm from above, and a coating solution containing the following components as a silicone adhesive coating was applied to one side of the stretched film in a longitudinal direction to ensure that the thickness of the coating film should become 40 nm after the following process of drying and stretching in a transverse direction. The coating solution used was an aqueous coating solution containing 83 parts by weight of a silane coupling agent (γ-glycidoxypropyl trimethoxysilane), 2 parts by weight of inorganic fine particles (20% dispersion of a silica sol having an average particle diameter of 6 nm and a pH of 9.5) and 15 parts by weight of a nonionic surfactant (polyoxyethylene nonylphenyl ether) and having a pH of 6.3 which had been adjusted by citric acid.

Thereafter, the film was supplied to a stenter to be stretched to 3.9 times in a transverse direction at 120° C. The obtained biaxially oriented film was heat set at 200° C. for 5 sec to obtain a 38 μm-thick biaxially oriented polyester film.

Table 1 shows the final thickness of each layer excluding the coating layer of the film and the materials, average particle diameters and amounts of lubricants added to each layer. Table 2 shows the evaluation results of a sample obtained from the center portion in the width direction of the obtained film. As shown in the results of Table 2, the film was satisfactory in all the characteristic properties.

Examples 2 to 4 and Comparative Examples 1 to 4

Polyester films of polyethylene terephthalate were formed in the same manner as in Example 1. In each example and each comparative example, as shown in Table 1, the thickness of each layer and the conditions for adding lubricants are different. The characteristic properties of the obtained films are shown in Table 2. In Comparative Example 1, a sample was obtained from an end portion in the width direction of the film. It is obvious from the results that the films of the present invention satisfied all the requirements.

TABLE 1

| | film thickness (μm) | | | | lubricant | | | | | | |
| | | | | | material of lubricant/ average particle diameter (nm) | | | amount of lubricant (wt %) | | | |
| | layer A | layer B | layer C | total thickness | a | b | c | | layer A | layer B | layer C |
|---|---|---|---|---|---|---|---|---|---|---|---|
| Ex. 1 | 5 | 28 | 5 | 38 | silicone resin 1200 | calcium carbonate 600 | alumina 400 | a b c | 0.01 0.2 0.1 | 0 0.04 0.02 | 0.01 0.2 0.1 |

TABLE 1-continued

| | film thickness (μm) | | | | lubricant | | | | | | |
| --- | --- | --- | --- | --- | --- | --- | --- | --- | --- | --- | --- |
| | | | | | material of lubricant/ average particle diameter (nm) | | | amount of lubricant (wt %) | | | |
| | layer A | layer B | layer C | total thickness | a | b | c | | layer A | layer B | layer C |
| Ex. 2 | 5 | 33 | — | 38 | silicone resin 1200 | calcium carbonate 600 | alumina 400 | a b c | 0.01 0.2 0.1 | 0 0.08 0.04 | — — — |
| Ex. 3 | 5 | 40 | 5 | 50 | silicone resin 1200 | calcium carbonate 600 | — | a b c | 0.01 0.2 — | 0 0.04 — | 0.01 0.2 — |
| Ex. 4 | 5 | 15 | 5 | 25 | silicone resin 1500 | calcium carbonate 600 | alumina 400 | a b c | 0.01 0.2 0.1 | 0 0.04 0.02 | 0.01 0.2 0.1 |
| C. Ex. 1 | 38 | — | — | 38 | porous silica 1700 | — | — | a b c | 0.07 — — | — — — | — — — |
| C. Ex. 2 | 38 | — | — | 38 | calcium carbonate 600 | — | — | a b c | 0.25 — — | — — — | — — — |
| C. Ex. 3 | 38 | — | — | 38 | silicone resin 1200 | — | — | a b c | 0.1 — — | — — — | — — — |
| C. Ex. 4 | 38 | — | — | 38 | silicone resin 1200 | calcium carbonate 600 | — | a b c | 0.01 0.2 — | — — — | — — — |

Ex.: Example
C. Ex.: Comparative Example

TABLE 2

| | haze value | orientation angle | Flyspecks |
| --- | --- | --- | --- |
| Ex.1 | ○ | ○ | ○ |
| Ex.2 | ○ | ○ | ○ |
| Ex.3 | ○ | ○ | ○ |
| Ex.4 | ○ | ○ | ○ |
| C.Ex.1 | ○ | X | X |
| C.Ex.2 | X | ○ | ○ |
| C.Ex.3 | X | ○ | ○ |
| C.Ex.4 | X | ○ | ○ |

A silicone resin coating solution having the following composition was applied to the coating layers of the biaxially oriented films of above Examples 1 to 4 in an amount of 8 g/m² (wet), dried at 130° C. for 30 sec and cured to obtain release films having a coating film thickness of 0.24 μm.
<Composition of Coating Solution>
curable silicone resin (KS847H): 100 parts by weight curing agent (CAT PL-50T: Shin-Etsu Silicone Co., Ltd.): 2 parts by weight
diluent: methyl ethyl ketone/xylene/methylisobutyl ketone: 898 parts by weight A polyester adhesive tape (Nitto-31B) was affixed to the release surfaces of the above release films, a 5 kg pressure roller was rolled back and forth over the tape, and the release films were left for 20 hours to measure the 180° tape adhesion of the films. The films had an adhesion of 9 g±2 g/25 mm which means that all the films for releasing a polarizing plate (release liners) had satisfactory release properties.

According to the present invention, there can be provided a film for releasing a polarizing plate, which has a small orientation angle, excellent transparency and high winding, lamination, inspection, release and transportation work efficiencies, and the industrial value of the film is high.

What is claimed is:

1. A biaxially oriented polyester film which comprises (A) a coextruded polyester film which comprises at least two layers, has a haze value of 4% or less and an orientation angle of 10° or less, and contains 5 or less impurities having a long diameter of 90 μm or more per 0.3 m² of the film plane and contains only 30 or less impurities having a long diameter of 20 to 50 μm per 0.3 m² of the film plane, and
   (B) a silicone adhesive layer formed on one side of the coextruded polyester film (A) and (C) which is used to release a polarizing plate, wherein the birefringence factor of the coextruded polyester film (A) which comprises at least two layers is 0.12 or less.

2. The film of claim 1, wherein the surface devoid of the adhesive layer (B) of the coextruded polyester film (A) has a center line average surface roughness Ra of 20 to 60 nm and a 10-point average surface roughness Rz of 500 nm or more.

3. The film of claim 1, wherein the surface of the adhesive layer (B) has a 10-point average surface roughness Rz of 500 nm or more.

4. The film of claim 1, wherein a layer underlying the adhesive layer (B) of the coextruded polyester film (A) contains inert particles having an average particle diameter of 1 to 3 μm in an amount of 50 to 300 ppm and inert particles having an average particle diameter of 0.05 to 0.8 μm in an amount of 100 to 4,000 ppm.

5. The film of claim 1, wherein the coextruded polyester film (A) has a thickness of 15 to 75 μm and a layer underlying the adhesive layer (B) has a thickness of 3 to 50% of the thickness of the coextruded polyester film (A).

6. The film of claim 1, wherein the adhesive layer (B) contains a product of hydrolysis of a silane coupling agent represented by the following formula (1):

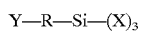  (1)

wherein Y is a vinyl group, epoxy group, amino group or mercapto group, R is a direct bond or alkylene group having 1 to 6 carbon atoms which may be interrupted by an amino group, and X is an alkoxy group having 1 to 6 carbon atoms.

7. The film of claim 1, wherein the thickness of the adhesive layer (B) is 0.02 to 1 $\mu$m.

8. A film for releasing a polarizing plate, comprising the biaxially oriented polyester film of claim 1 and a silicone layer formed on the adhesive layer (B) of the biaxially oriented polyester film.

* * * * *